United States Patent [19]

Niskanen

[11] Patent Number: 5,018,258
[45] Date of Patent: May 28, 1991

[54] SUPPORT SYSTEM FOR A VARIABLE-CROWN ROLL

[75] Inventor: Juhani Niskanen, Oulansalo, Finland

[73] Assignee: Valmet Paper Machinery Inc., Finland

[21] Appl. No.: 444,726

[22] Filed: Dec. 1, 1989

[30] Foreign Application Priority Data

Dec. 15, 1988 [FI] Finland ............................. 885801

[51] Int. Cl.⁵ .............................................. B21B 13/02
[52] U.S. Cl. .................................. 29/116.2; 29/113.2
[58] Field of Search ................ 29/113.1, 113.2, 116.1, 29/116.2, 129, 895, 895.2; 72/243, 245; 100/162 B; 162/357, 358

[56] References Cited

U.S. PATENT DOCUMENTS

| | | | |
|---|---|---|---|
| 3,802,044 | 4/1974 | Spillmann et al. | 29/113.2 |
| 3,932,921 | 1/1976 | Biondetti | 29/116.2 |
| 4,241,482 | 12/1980 | Biondetti | 29/116.2 |
| 4,373,238 | 2/1983 | Güttinger | 29/116.2 |
| 4,815,183 | 3/1989 | Bondetti | 29/116.2 |

FOREIGN PATENT DOCUMENTS 2229421 1/1974 Fed. Rep. of Germany .
59655 12/1972 Finland .

Primary Examiner—Timothy V. Eley
Assistant Examiner—Peter Dungba Vo
Attorney, Agent, or Firm—Steinberg & Raskin

[57] ABSTRACT

A support arrangement is provided for a variable-crown having a non-revolving roll axle (11) on which the roll mantle (12) revolves. The roll mantle (12) is supported on the roll axle (11) by means of hydraulic loading members (20) which comprise pistons (21) fitted into cylinder bores (15) formed in the roll axle (11), as well as glide shoes (22) supported on the inner face (14) of the roll mantle. The pistons (21) are composed of bushings provided with inside cavity spaces (23). The glide shoes (22), which are attached to the outer ends of the pistons through the cavity spaces (23) from outside the bushings, are hydraulically sealed (30), and are pivotal and displaceable in the radial direction of the roll (10). A hydraulic pressure medium is passed into the cavity spaces (23) in the pistons (21) so as to act upon the interior of the glide shoes (22). The hydraulic medium passes, via the cavity spaces (23), through capillary bores (28,28') into pockets (31), the latter acting as hydrostatic lubrication spaces of the glide shoes (22).

6 Claims, 2 Drawing Sheets

SUPPORT SYSTEM FOR A VARIABLE-CROWN ROLL

BACKGROUND OF THE INVENTION

The invention concerns a support system for a variable-crown roll, wherein the roll comprises a non-revolving roll axle with a rotatable roll mantle displaced on the axle. Between the roll mantle and roll axle are displaced hydraulic loading elements which act upon the underface of the roll mantle in the nip plane. The hydraulic elements are supported on the roll axle, and are loaded by means of a hydraulic pressure medium. The hydraulic elements include pistons fitted into cylinder bores or equivalent formed in the roll axle as well as glide shoes supported on the inner face of the roll mantle.

In the paper machines and equivalent apparatus, such rolls are commonly used to form a smoothing nip, a dewatering press nip, or a calendering nip with a counter-roll. For these purposes, it is important that the distribution of a linear load in the nip, i.e. the profile, in the axial direction of the rolls be made invariable, or that this profile can be regulated as desired. This permits controlling the transverse moisture profile and/or the thickness profile (caliper) of the web of paper or similar material. For this purpose a number of different variable-crown rolls are known in the prior art for controlling the distribution of a linear load in the nip.

In the prior art, a number of different variable-crown rolls for paper machines and equivalent apparatus are known. As a rule, these rolls comprise a massive or tubular, stationary roll axle and a roll mantle disposed for revolving around the axle. Between the axle and the roll mantle, and acting upon the inner face of the mantle, glide shoe arrangements and/or a chamber of pressure fluid or a series of chambers are fitted, so that the axial profile of the mantle at the nip can be aligned or regulated as desired. As a rule, the nips formed by such rolls, such as press nips or calendering nips, are loaded by means of loading forces applied to the axle journals of the variable-crown roll and of its counter-roll.

The present invention relates to such variable-crown rolls which comprise a series of glide shoes whose glide faces act on the inner face of the roll mantle and whose glide faces are at least partly hydrostatically or hydrodynamically lubricated by means of a pressure fluid passed to the glide face.

With respect to the prior art related to the present invention, reference is made, by way of example, to the DE Published Patent Application No. 22 29 421 and to the FI Patent No. 59,655. In the DE publication, the glide shoe arrangement is described that is used perhaps most commonly in variable-crown rolls. In the structures in accordance with the DE publication, the hydraulic loading elements by means of which the roll mantle is supported on the non-revolving roll axle, includes pistons fitted for displacement in cylinder bores provided in the axle, there being the guide shoes which act on the inner face of the roll mantle, and are supported on the pistons by means of articulated joints. In such an arrangement, very high forces are obtained in the articulated joint between the glide shoe and the piston, for which reason the articulated joint must be hydraulically relieved in order that its service life can be made sufficiently long. In spite of the relief, a friction of a certain magnitude is always present in such an articulated joint, as a result of which the glide shoe cannot be fully freely positioned in relation to the piston. Owing to the articulated joint, the sealing arrangements of the loading member may also become quite problematic. Owing to all this, the cost of manufacture of such a loading element provided with an articulated joint is high, and the operation of the element is not satisfactory in all circumstances because of the friction present in the articulated joint.

In the cited FI Patent, the construction of the hydraulic loading member is accomplished such that the loading element is formed as a rigid piece which has no articulated joint. In the FI patent, this is carried into effect in two alternative ways, according to one embodiment of which cylinder bores have been formed in the roll axle, the piston parts of the loading members being fitted for movement in the cylinder bores. In this embodiment, the piston parts have been shaped to be spherical so that they can turn in the cylinder bores. In the other embodiment, pin-like projections corresponding to the cylinder bores have been forced on the roll axle, the glide shoes being supported and sealed pivotally on the projections. In the first embodiment of the cited FI patent, the support point of the glide shoe is placed quite far from the inner face of the roll mantle, whereby the construction is quite unstable. On the other hand, in the second embodiment, the glide shoes must be able to move a relatively long distance in the radial direction of the roll. Both of these embodiments are quite problematic in view of the sealing and, moreover, the positioning of a slide shoe against the inner face of the roll mantle is hampered by friction at the sealing point. The shoe must be able to move by a distance equalliug the stroke length of the loading element.

SUMMARY OF THE INVENTION

The primary object of the present invention is to provide an improved support system for a variable-crown roll so that the support system does not involve the drawbacks described above. To achieve this objective, the invention is mainly characterized in that the pistons comprise bushings provided with interior cavity spaces, and that the glide shoes are attached to the pistons through the cavity spaces from outside the bushing. The bushing is hydraulically sealed, is pivotal, and is displaceable in the radial direction of the roll. Also, a hydraulic pressure medium can be passed into the cavity spaces in the pistons so as to act upon the lower faces of the glide shoes and, out of the cavity spaces through capillary bores into the pockets acting as hydrostatic lubrication spaces of the glide shoes.

By means of the invention, compared with the prior art, several remarkable advantages are obtained. Among which the following should be noted. In the solution of the invention, the hydraulic loading elements of a variable-crown roll are formed of two parts, so that there is no need for a mechanical articulated joint between the glide shoe and the piston. The glide shoe is loaded in relation to the piston exclusively hydraulically, whereby the glide shoe can be positioned freely against theroll mantle. Friction in the articulated joint, which is involved in the conventional solutions, does not hamper this positioning. In the system of the invention, the support point of the glide shoe is placed very close to the surface of the glide shoe and, moreover, the position of the support point relative the roll mantle is independent of the stroke length and of the shoe position. In the system of the invention, in the loading members, a bushing-shaped, hollow piston is used, whereby, if necessary, long capillary bores extending into the hollow piston can be formed in the glide shoes. The risk of blocking the bores is very small because the diameter of the capillary bores can be made larger. Moreover, in the system in accordance with the invention, the construction of the hydraulic loading elements is very simple, and therefore the cost of manufacture is low.

BRIEF DESCRIPTION OF THE DRAWING

In the following, the invention will be described in detail with reference to an exemplifying embodiment of the invention illustrated in the figures in the accompanying drawing, the invention being by no means strictly confined to the details of said embodiment, wherein.

DETAILED DESCRIPTION

Figure 1:
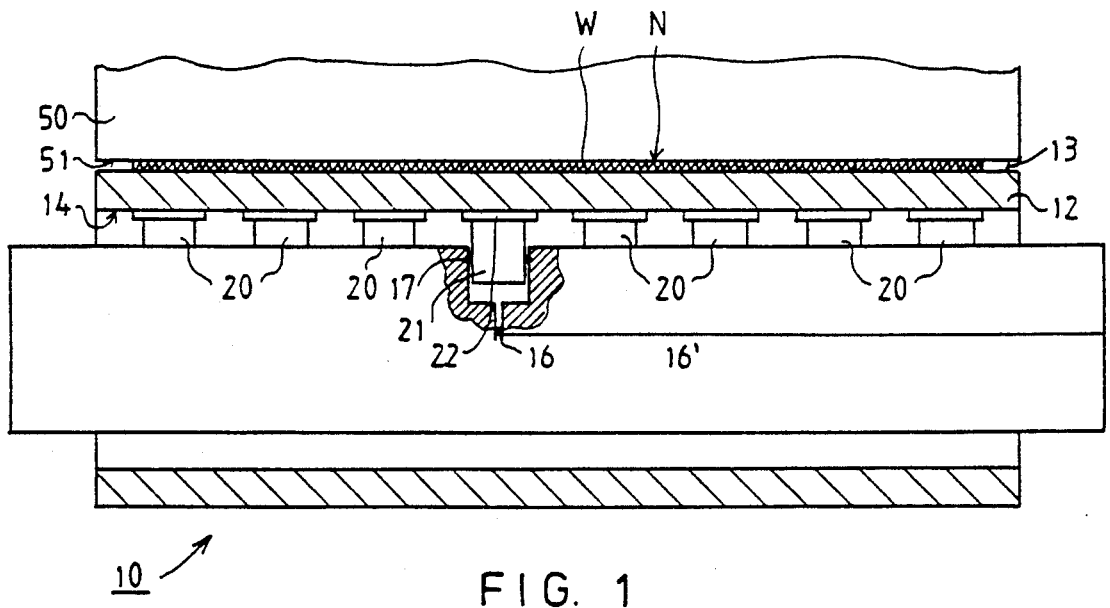
FIG. 1 is a schematic axial vertical sectional view of a variable-crown roll which is provided with a support system in accordance with the invention and which forms a nip with a counter-roll.
Figure 2:
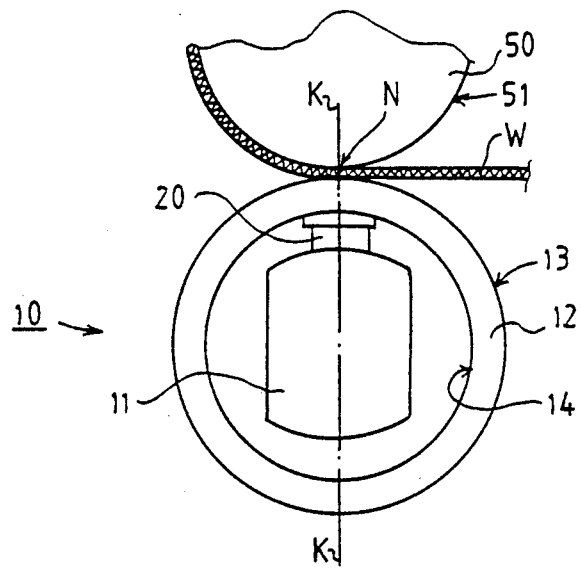
FIG. 2 is a schematic end in view of the roll of FIG. 1

With reference to FIGS. 1 and 2, the general construction of a variable-crown roll will be described, in which roll 10 is incorporated a support system of the invention. The variable-crown roll 10 comprises a stationary roll axle 11 and a roll mantle 12 is rotatable about the axle 11. Placed opposite the variable-crown roll 10, there is a counter-roll 50. The outer face 13 of the roll 10 and the outer face 51 of the counter-roll 50 jointly form a nip N, which may be, e.g., a press nip, a calendering nip, or the equivalent, through which nip, e.g., a paper web W or equivalent is passed. Between the axle 11 and the roll mantle 12 in the variable-crown roll, there are located hydraulic loading elements 20 which act upon face 14 of the roll mantle. The elements 20 act in the nip plane K—K. In the axial direction of the roll 10, a number of hydraulic loading elements 20, placed at a distance from one another, are arranged to act upon the inner face 14 of the roll. Compression by the loading elements against the inner face 14 of the mantle is adjustable individually or in groups such that the axial profile of the roll mantle 12 is adjustable in a desired way.

In the construction of the hydraulic loading elements 20, cylinder bores 15 are formed in the roll axle 11. The elements 20 are disposed in the bores 15 to be displaceable in the nip plane K—K, the bores 15 and the loading element 20 being sealed means of seal 17. For the purpose of loading the hydraulic loading elements 20 against the inner face 14 of the roll mantle, a medium such as hydraulic fluid is passed into the cylinder bores via pressure ducts 16 and 16'. In FIGS. 1 and 2, for the sake of clarity of the illustration, the end bearings of the rolls and other, corresponding auxiliary devices have been omitted.

Figure 3:
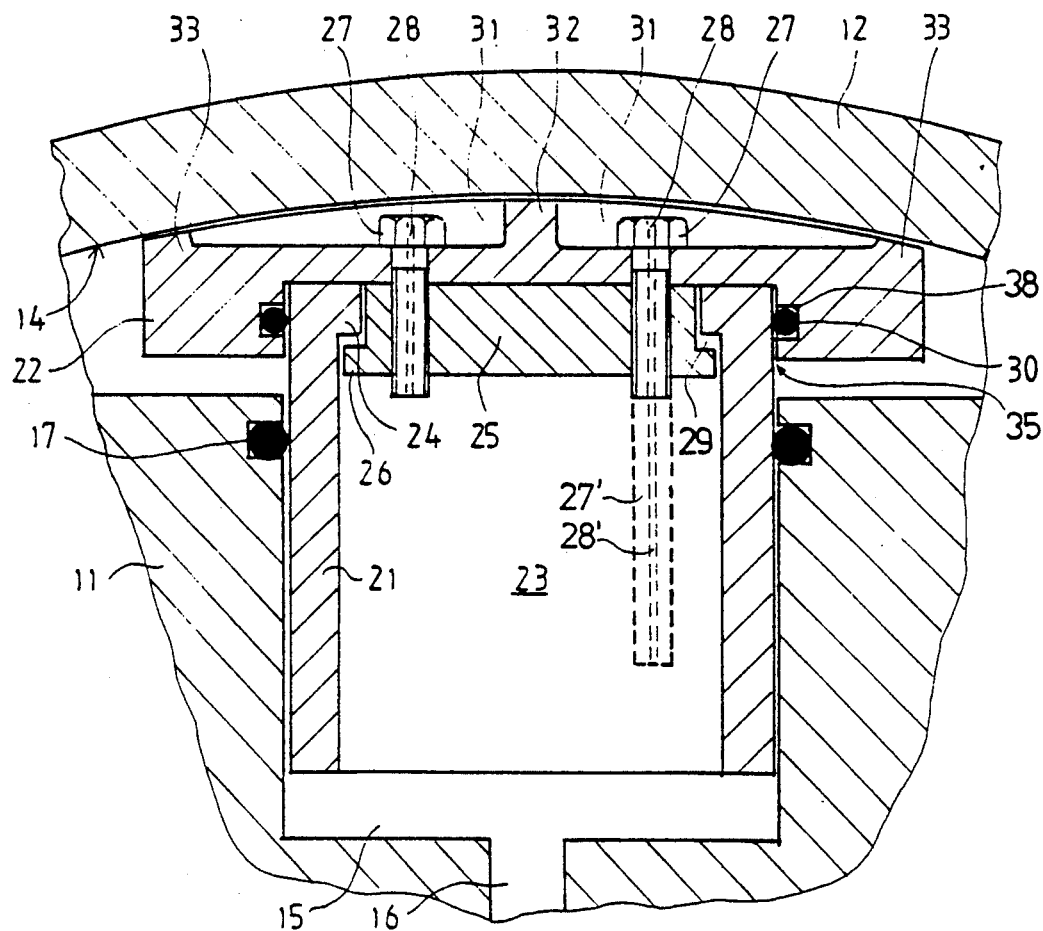
FIG. 3 is an enlarged sectional view, transverse to the roll, of one hydraulic loading element in the support system in accordance with the invention.
Figure 4:
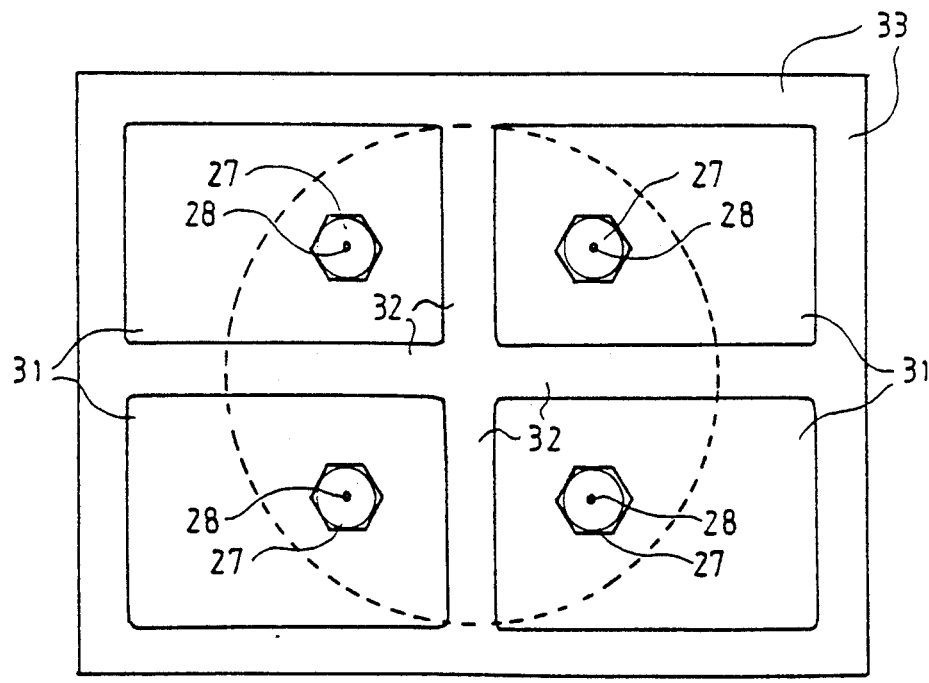
FIG. 4 shows the glide shoe of a hydraulic loading seen elements seen from the direction of the inner face of the roll mantle.

FIGS. 3 and 4 are more detailed illustrations of the structure of one hydraulic loading element 20 belonging to the support system of the invention. The hydraulic loading element 20 comprises a piston 21 moving in the radial direction of the roll in the cylinder bore 15, provided in the roll axle 11, and a glide shoe 22 placed against the inner face 14 of the roll mantle. As is shown in FIG. 3, the piston 21 is a hollow, bushing-shaped piece, in whose interior there is a large cavity space 23. The glide shoe 22 is fitted on the bushing-shaped piston 21 and, for the purpose of fitting the glide shoe 22 and the piston 21 together, a recess 35 corresponding to the cross-sectional form of the piston 21 has been formed into the lower face of the glide shoe, into which recess the outer end of the piston 21 is fitted. The recess 35 in the glide shoe 22 is somewhat larger than the cross-section of the piston 21 so that the glide shoe 22 and the piston 21 can move relative to one another. For the purpose of sealing the piston 21 and the glide shoe 22 to each other, a seal groove 38 running around the recess has been formed into the side face of said recess 35, and into said groove 38 a seal 30 has been fitted, which is in contact with the outer face of the piston 21.

In order to attach the piston 21 and the glide shoe 22 to one another, the piston 21 includes a shoulder 24 directed towards the interior of the piston 21, namely, towards the cavity space 23. The shoulder 24 is formed into the outer end of the bushing-shaped piston 21. Similarly, into the cavity space 23 in the piston, a separate fastening piece 25 has been fitted, which is attached to the glide shoe 22 rigidly by means of fastening screws 27. Thus, the fastening piece 25 is fixed rigidly on the inner face of the glide shoe 22. On the other hand, onto the fastening piece 25 a shoulder 26 has been formed which is directed outwards in the radial direction of the piston. The piece 25 is placed between the shoulder 24 on the piston and the bottom of the cylinder bore 15. Thus, said shoulders 24 and 26 prevent removal of the glide shoe 22 from the piston 21. The shoulders 24 and 26 are, however, not in contact with each other, but are arranged such that, when the glide shoe 22 rests on the piston 21, a gap 29 remains between the shoulders 24 and 26, said gap permitting movement of the piston 21 and the glide shoe 22 relative to one another. Thus, the glide shoe 22 is capable of moving in the axial direction of the piston 21 in relation to the piston by the distance permitted by the gap 29. Moreover, the glide shoe 22 can be inclined in relation to the piston 21, because the cross-section of the piston 21 is smaller than the recess 35 provided in the lower face of the glide shoe 22, as was already described above.

In the conventional way, into the curved outer face of the glide shoe 22, i.e. into the face placed towards the inner face 14 of the roll mantle, pockets 31 have been formed. The pockets act as hydrostatic lubrication spaces, and are separated from each other by intermediate ridges 32 and edge ridges 33. Into the pockets 31, lubricant is passed through capillary bores 28 formed in the fastening screws 27 so as to provide a fluid film between the glide shoe 22 and the inner face 14 of the roll mantle. Since the system of the invention employs a hollow, bushing-shaped piston 21, in whose interior there is a large cavity space 23, if desired, it is possible to use long fastening screws 27', shown by dashed lines in FIG. 3, which extend to the proximity of the inner end of the piston 21. Thus, the capillary bores 28' can be made remarkably long, i.e. almost equal to the length of the entire hydraulic loading member 20. Thereby an advantage is obtained in that, when long capillary bores 28' are used, to a corresponding extent the diameter of the capillary bores can be made larger, whereby their risk of being blocked is substantially lower than in the case of shorter capillary bores 28. The location of the support point of the glide shoe 22 in relation to the roll mantle 12 is independent of the position of the piston 21 in the cylinder bore 15. The support point of the glide shoe 22 is always placed at the inner face of the fastening piece 25 and at the bottom of the recess 35 formed in the glide shoe 22 because of the absence of an articulated joint between the piston 21 and the glide shoe 22. Thus, the glide shoe 22 can move quite freely in relation to the piston 21 The only factor that restricts the movement of the glide shoe 22, within its range of movement, is the friction force derived from the seal 30.

When the hydraulic loading elements 20 are loaded in the support system of the invention by passing pressure medium into the cylinder bores 15, the pressure medium enters into the cavity space 23 in the piston 21, and thereby presses the glide shoe 22 against the inner face 14 of the roll mantle. Thus, the piston 21 does not restrict the movement or the position of the glide shoe 22 but it acts only as a guide for the glide shoe 22. The lubricant can exit the cavity space 23 in the piston along the capillary bores 28 and 28, onto the inner face 14 of the roll mantle to form a fluid film between the glide shoes 22 and the inner face of the roll mantel. When the roll axle 11 is deflected by the effect of loading forces, then the glide shoes 22 can be positioned to mate with the roll mantle 12 Also the pistons 21 can be positioned in alignment with the axle 11 because the pistons 21 and the glide shoes 22 can turn freely in relation to one another.

The invention has been described by way of example with reference to the figures in the accompanying drawing. This is, however, not intended to confine the invention to the exemplifying embodiments shown in the figures alone. Variations may be possible within the scope of the inventive idea defined in the accompanying claims.

I claim:
1. A variable crown roll system comprising:
a non-rotating roll axle;
a cylindrical roll mantle enclosing said axle and being rotatable about said axle;
a plurality of hydraulic loading elements enclosed by said mantle and connecting with said axle for positioning said mantle relative to a further roll to define therewith a nip, an axis of rotation of said mantle and an axis of rotation of said further roll defining a plane of the nip; and
wherein each of said hydraulic loading element comprises:
a cylinder bore formed within said axle and having an axis lying in said nip plane;
a piston formed as a cylindrical bushing with an internal cavity and mounted for translation within said cylinder bore;
a guide shoe supported on an outer end of said piston and being free to pivot relative to said piston and to undergo displacement relative to said piston in a radial direction of said mantle;
a seal disposed between said piston and said shoe to provide a hydraulic seal between said piston and said shoe;
lubrication pockets disposed in a surface of said shoe facing an interior surface of said mantle;
capillary bores interconnecting said lubrication pockets with said piston bushing cavity;
a fastening piece secured to said glide shoe and extending into the outer end of said piston bushing for securing said glide shoe to said piston; and
wherein said fastening piece has a radially outwardly extending shoulder;
the outer end of said piston bushing has a radially inwardly extending shoulder of said fastening piece for securing said glide shoe to said piston bushing; and
a gap is disposed between said inwardly and said outwardly extending shoulders to permit relative motion between said piston and said glide shoe; and
wherein said hydraulic loading elements are activated by a hydraulic pressure medium applied to the cavities of respective pistons to urge the respective glide shoes against the interior surface of said mantle, the hydraulic medium passing through the capillary bores into the lubrication pockets to act as hydrostatic lubrication between said shoes and said mantle.

2. The system according to claim 1, wherein, in each of said hydraulic loading elements, there is a plurality of fastening screws interconnecting said glide shoe with said fastening piece, said fastening screws extending from respective lubrication pockets through said glide shoe and through said fastening piece to the cavity of said piston bushing; and
wherein said capillary bores are disposed within respective ones of said fastening screws for communicating between respective ones of said lubrication pockets and said bushing cavity.

3. The system according to claim 2, wherein, in each of said hydraulic loading elements, said fastening screws extend more than halfway through the cavity of the piston bushing.

4. The system according to claim 1, wherein, in each of said hydraulic loading elements, an inner face of said glide shoe facing said piston bushing is provided with a recess encircling the outer end of said piston bushing, said seal being positioned in said recess.

5. The system according to claim 4, wherein, in each of said hydraulic loading elements, said seal is formed as an annular seal located between an outer cylindrical surface of said piston bushing and an inwardly facing surface of a wall of said recess.

6. The system according to claim 5, wherein, in each of said hydraulic loading elements, the inwardly facing surface of the wall of said recess has a circumferential groove therein, said seal being seated in said groove.

* * * * *